United States Patent Office 3,287,299
Patented Nov. 22, 1966

3,287,299
VINYL HALIDE RESIN STABILIZERS COMPRISING PHOSPHITES PREPARED FROM POLYOLS, SECONDARY PHOSPHITES AND TERTIARY PHOSPHITES
Chrysosthenis M. Canarios, New Providence, N.J., assignor, by mesne assignments, to Tenneco Chemicals, Inc., a corporation of Delaware
No Drawing. Filed July 29, 1963, Ser. No. 298,495
27 Claims. (Cl. 260—23)

This invention relates to liquid, solvent-free stabilizers for halogen-containing resins and to a method for their production. It further relates to resinous compositions that contain these stabilizers.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat stability, it is necessary that vinyl halide resin compositions show little or no tendency to plate-out during processing. Plate-out is the result of the separation of one or more ingredients, usually pigments and stabilizers, from a resinous composition during the various stages of its processing and the deposition of these materials onto the metal surfaces of the processing equipment. These deposits on the metal surfaces may cause streaking or spotting of the finished products. They may also interfere with sheet transfer from roll to roll or with the removal of the product from the mold thereby reducing the rate of production. To be useful commercially, the compositions should also have good color, clarity, and light stability.

In the past vinyl halide resin compositions have generally contained as heat and light stabilizers mixtures of solid components, mixtures of solid and liquid components, or solutions of these components in hydrocarbon or other organic solvents. While such stabilizers may impart the required heat and light stability to the compositions, they are usually not completely compatible with the vinyl halide resin and the other ingredients that are used. Even when their preparation is carefully carried out, the compositions containing these stabilizers are often not completely homogeneous as is indicated by their tendency to plate-out and by the cloudiness of thin sheets of the compositions.

It is therefore an object of the present invention to provide stabilizers that when incorporated into a vinyl halide resin will protect the resin from thermal degradation for a prolonged period of time. It is a further object to provide liquid, solvent-free stabilizers that are completely compatible with vinyl halide resins and that will form resinous compositions that are characterized by exceptional clarity and resistance to plate-out. Another object is to provide vinyl halide resin compositions that are stabilized against the deteriorative effects of heat and light. It is still another object of this invention to provide stabilized vinyl halide resin compositions of unusual clarity that have little tendency to plate-out. Other objects and advantages of the present invention will be apparent from the detailed disclosure that follows.

In accordance with the present invention, it has been found that vinyl halide resin compositions that have excellent heat and light stability, color, clarity, resistance to plate-out, and other valuable properties are obtained by incorporating certain liquid, solvent-free stabilizers into the compositions. Unlike the previous known stabilizers for vinyl halide resin compositions, these novel stabilizers are thoroughly compatible with the vinyl halide resins and other ingredients of the compositions. They may be readily and conveniently blended with the vinyl halide resin and other ingredients to form stabilized compositions that are clear and that have little or no tendency to plate out.

The novel liquid stabilizers of the present invention comprise solutions of a phenolic compound and monocarboxylic acid salts of certain polyvalent metals in a mixture of tertiary organic phosphites.

The mixture of tertiary organic phosphites that serves as the solvent for the phenolic compound and the metal salts is the product obtained by reacting a secondary organic phosphite and a tertiary organic phosphite with sufficient polyhydric alcohol to complete the esterification of the secondary phosphite and to transesterify at least a portion of the tertiary phosphite. In most cases approximately 0.5 mole to 5 moles of the secondary organic phosphite and 2 moles to 15 moles of the tertiary organic phosphite are used per mole of polyhydric alcohol. Particularly advantageous results have been obtained by using 1 mole to 3 moles of the secondary organic phosphite and 5 moles to 10 moles of the tertiary organic phosphite per mole of polyhydric alcohol.

The manner in which the reactions of the phosphites and the polyhydric alcohol are carried out is not critical. For example, the polyhydric alcohol may be reacted with the secondary organic phosphite before the addition of the tertiary organic phosphite, or the polyhydric alcohol may be reacted simultaneously with the secondary and tertiary organic phosphites. Alternatively, the polyhydric alcohol may be reacted with the secondary organic phosphite and a portion, usually approximately 10% to 20%, of the tertiary organic phosphite before the remainder of the tertiary organic phosphite is added. The reactions may be carried out by heating the polyhydric alcohol with the phosphites at a temperature between approximately 100° C. and 180° C. and preferably between 120° C. and 130° C. until a substantially clear solution is obtained. In accordance with the present invention, the reactions between the polyhydric alcohol and the phosphites need only be carried to the point at which the reaction mixture is a substantially clear liquid. If desired, however, these reactions may be carried to completion.

The product resulting from these reactions is a complex mixture that contains a major amount of tertiary organic phosphites including those phosphites derived from the polyhydric alcohol and minor amounts of the phenols and monohydric alcohols formed as by-products of the transesterification reaction. It may also contain a small amount of unreacted polyhydric alcohol.

The polyhydric alcohols that can be used in the preparation of this mixture of tertiary organic phosphites include pentaerythritol, sorbitol, mannitol, trimethylolethane, and trimethylolpropane as well as mixtures of these alcohols. Since their use results in resinous compositions having the best clarity and resistance to plate-out, pentaerythritol and sorbitol are the preferred polyhydric alcohols for use in the practice of this invention.

The tertiary organic phosphites that may be used include a wide variety of trialkyl phosphites, triaryl phosphites, and alkyl aryl phosphites. A single tertiary phosphite or a mixture of two or more of these compounds may be used. The preferred tertiary phosphites are the alkyl aryl phosphites and the triaryl phosphites in which the alkyl groups are straight-chain or branched-chain groups having from 2 to 18 carbon atoms and preferably from 4 to 10 carbon atoms and the aryl groups are phenyl groups or substituted phenyl groups in which the substituents are hydroxyl groups, halogen atoms, or alkyl groups having from 1 to 12 carbon atoms. Illustrative of these tertiary organic phosphites are the following: triphenyl phosphite, tri(p-tert. butylphenyl) phosphite, tridecyl phosphite, diphenyl butyl phosphite, diphenyl octyl phosphite, diphenyl decyl phosphite, phenyl dibutyl phosphite, phenyl di-2-ethylbutyl phosphite, phenyl dioctyl phosphite, di-p-tert. octylphenyl 2-ethylhexyl phosphite, di(nonylphenyl)-2-chloroethyl phosphite, and chlorophenyl di(β-chloropropyl) phosphite.

The secondary organic phosphites that may be used in the preparation of the aforementioned mixture of tertiary organic phosphites include dialkyl phosphites, diaryl phosphites, alkyl aryl phosphites, and mixtures thereof, the preferred secondary phosphites being alkyl aryl phosphites and diaryl phosphites in which the alkyl groups have from 2 to 18 carbon atoms and preferably from 4 to 10 carbon atoms and the aryl groups are phenyl groups or substituted phenyl groups in which the substituents are hydroxyl groups, halogen atoms, or alkyl groups having from 1 to 12 carbon atoms. Specific examples of the preferred secondary phosphites are diphenyl phosphite, di(hydroxyphenyl) phosphite, dioctyl phosphite, phenyl p-tert. butylphenyl phosphite, phenyl hexyl phosphite, chlorophenyl n-decyl phosphite, p-tert. butylphenyl butyl phosphite, and phenyl n-decyl phosphite.

In a preferred embodiment of the invention the secondary organic phosphite that is used in the preparation of the mixture of tertiary phosphites is the hydrolyzed product obtained by treating a tertiary organic phosphite with 0.8 mole to 1.5 moles of water and preferably approximately 1 mole of water per mole of the tertiary phosphite. The hydrolysis of the tertiary phosphite may be carried out at a temperature in the range of 50° C.–120° C. and preferably 65° C.–110° C. The hydrolyzed phosphite that is obtained need not be purified or otherwise treated prior to its use in the stabilizer mixtures. As used herein, the term "hydrolyzed phosphite" refers to the product resulting from the hydrolysis of a tertiary organic phosphite under the aforementioned conditions, this product being a mixture of one or more secondary phosphites and the phenol and/or alcohol formed as the by-product of the hydrolysis reaction.

While it is generally preferred that the secondary and tertiary organic phosphites that are used in the practice of this invention have the same organic moieties, excellent stabilizers may also be prepared by using secondary and tertiary phosphites having different organic moieties.

The novel liquid stabilizers are prepared by dissolving a phenolic compound and monocarboxylic acids salts of certain polyvalent metals in the aforementioned mixture of tertiary organic phosphites. This may be accomplished conveniently by adding the phenolic compound and metal salts to the phosphite mixture and heating the resulting mixture at a temperature between 100° C. and 180° C. and preferably between 120° C. and 140° C. until a clear solution is obtained. It is generally preferred to dissolve the phenolic compound and the metal salts individually in the hot reaction mixture. This may be accomplished by adding one of these stabilizer components and heating the reaction mixture at the indicated temperature until it becomes clear before adding the next component and repeating the heating step. It is to be understood that while a major amount of the metal salts dissolves in the mixture of tertiary organic phosphites, small amounts of these salts may react with the phosphites and other components of the phosphite mixture to form other derivatives of these metals.

If resin compositions that have the desired heat stability and other properties are to be obtained, the stabilizer must contain monocarboxylic acid salts of at least two metals selected from the group consisting of barium, cadmium, zinc, lead, and tin. It is preferred that at least one of these salts be derived from an aromatic monocarboxylic acid. Excellent results have been obtained when the stabilizer contained a mixture of barium, cadmium, and zinc salts that included at least one salt derived from an aromatic monocarboxylic acid and at least one salt derived from an aliphatic monocarboxylic acid and particularly when the stabilizer contained a cadmium salt having an aromatic anion and a barium salt having an aliphatic anion. If desired, other salts of these metals may also be present. The zinc salt that is used in the stabilizer may have either an alphatic anion or an aromatic anion.

The aliphatic acids from which the metal salts may be derived are the saturated and unsaturated monocarboxylic acids having from 2 to 22 carbon atoms. Particularly advantageous results have been obtained using salts prepared from fatty acids having from 6 to 18 carbon atoms, for example, caproic acid, caprylic acid, 2-ethylhexanoic acid, pelargonic acid, capric acid, lauric acid, myristic acid, palmitic acid, stearic acid, oleic acid, and linoleic acid, or from naturally-occurring mixtures of these acids, such as tallow fatty acids, coconut oil fatty acids, tall oil fatty acids, soybean oil fatty acids, and cottonseed oil fatty acids.

The aromatic acids from which the metal salts may be derived include benzoic acid and substituted benzoic acids in which the substituents are halogen atoms or alkyl groups containing not more than 8 carbon atoms. Illustrative of these substituted benzoic acids are toluic acids, xylic acids, ethylbenzoic acids, isopropylbenzoic acids, p-tert. butylbenzoic acid, di-tert. butylbenzoic acid, octylbenzoic acids, chlorobenzoic acids, and bromobenzoic acids.

A wide variety of monohydric and polyhydric phenols may be used in the novel stabilizers. The monohydric phenols are substituted phenolic compounds in which the substituents are halogen atoms, alkyl groups, aryl groups, nitro groups, amino groups, carboxyl groups, carbalkoxy groups, and the like. A preferred group of monohydric phenols are the alkylphenols having the formula

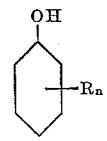

in which R represents an alkyl group having from 1 to 8 carbon atoms and $n$ represents a number in the range of 1 to 3. Illustrative of these monohydric phenols are the following: cresols, xylenols, carvacrol, thymol, butylphenols, octylphenols, chlorophenols, bromophenols, butylcresols, p-hydroxybenzoic acid and its lower alkyl esters, salicylic acid and its lower alkyl and aryl esters, and alkylphenylphenols.

The useful polyhydric phenols include both polynuclear phenols and those phenols that have two or more hydroxyl groups attached to a single aromatic nucleus. A preferred group of polyhydric phenols are the bisphenols that have the formula

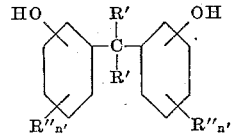

in which each R' represents a hydrogen atom or a lower alkyl group, R" represents a lower alkyl group or a halogen atom, and n' represents a number in the range of 0 to 3. Illustrative of these polyhydric phenols are the following: resorcinol, alkylresorcinols, catechol, hydroquinone, orcinol, hydroxyhydroquinone, hexahydrobenzene, 2,2-bis(4-hydroxyphenyl)-propane, 2,2-bis(4-hydroxydichlorophenyl) - propane, 2,2 - bis(4 - hydroxyphenyl) butane, 4,4'-dihydroxybenzophenone, 4,4'-dihydroxybiphenol, 1,5-dihydroxynaphthalene, 2,2'-methylene bis(4-methyl-6-tert. butylphenol), 4,4'-methylene bis(2,6-di-tert. butylphenol), 4,4'-butylidene bis(3-methyl-6-tert. butylphenol), 4,4'-thiobis(3-methyl-6-tert. butylphenol), 2,2' - dihydroxy - 3,3',5,5' - tetramethylstilbene, methylene bis($\beta$-naphthol), methylene bis(salicylic acid), 2,2'-isopropylidene bis(4-methyl-6-tert. butylphenol), N-salicoyl-p-aminophenol, and the like. A single phenolic compound or a mixture of two or more of these compounds may be used.

The stabilizer compositions of the present invention generally contain approximately 2 parts to 10 parts by weight of the phenolic compound, 10 parts to 35 parts by weight of the barium salt, 5 parts to 25 parts by weight of the cadmium salt, and 5 parts to 25 parts by weight of the zinc salt per 100 parts by weight of the mixture of tertiary organic phosphites. The preferred compositions contain 3 parts to 5 parts by weight of the phenolic compound, 15 parts to 25 parts by weight of the barium salt, 7 parts to 15 parts by weight of the cadium salt, and 10 parts to 15 parts by weight of the zinc salt per 100 parts by weight of the mixture of tertiary organic phosphites. The amount of each of the components that is used in the stabilizer is largely dependent upon the compound selected and the properties desired in the stabilized composition.

Only a small amount of the novel stabilizer need be present in the vinyl halide resin compositions of the present invention. It has been found that as little as 0.1% of the stabilizer, based on the weight of the vinyl halide resin, will bring about an appreciable improvement in the heat and light stability of the composition. Approximately 10% or more of the stabilizer can be used, but these larger amounts generally do not provide further improvement in the properties of the resinous composition and for this reason are not ordinarily used. While the amount of the stabilizer that will provide optimum heat and light stability, clarity, and resistance to plate-out depends upon such factors as the composition of the stabilizer and the choice of vinyl halide resin, in most cases 0.5% to 5% of the stabilizer, based on the weight of the vinyl halide resin, is used.

The vinyl halide resins that may be used in the compositions of this invention are the resinous products obtained by the polymerization of a vinyl halide in the presence or the absence of a copolymerizable monomer. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer, such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those prepared from at least 70% of vinyl halide and up to 30% of the comonomer. The invention is also applicable to mixtures containing polyvinyl chloride in a major proportion and a minor proportion of such other synthetic resins as chlorinated polyethylene, polyacrylate and polymethacrylate esters, and copolymers of acrylonitrile, butadiene, and styrene.

Any of the usual plasticizers for vinyl halide resins may be used in the stabilized compositions of the present invention. These include, for example, di-2-ethylhexyl phthalate, dibutyl sebacate, tricresyl phosphate, and octyl diphenyl phosphate. The plasticizer is generally present in the amount of approximately 5 parts to 100 parts per 100 parts of resin. Other heat and light stabilizers, pigments, fillers, extenders, dyes, and the like may also be present in the stabilized resinous compositions in the amounts ordinarily employed for the purposes indicated.

The stabilized vinyl halide resin compositions may be prepared by any convenient procedure. It is generally preferred to blend the liquid stabilizer with the vinyl halide resin at room temperature and to mill the resulting composition on a two roll mill at 300° F. to 400° F. for a time sufficient to form a homogeneous sheet. The plasticizer and other additives may be incorporated with the stabilizer. The stabilized composition is then removed from the mill in the form of a sheet or film of the desired thickness which may be used as such or subjected to a polishing or embossing treatment.

The invention is further illustrated by the examples that follow. It is to be understood, however, that these examples are given solely for the purpose of illustration and that the invention is not to be regarded as being limited to any of the specific materials or conditions recited therein except as set forth in the appended claims.

EXAMPLE 1

To 562 grams of diphenyl decyl phosphite which had been heated to 75° C. was added 27 grams of water over a period of one hour. Upon completion of the water addition, the mixture was heated at 105°–110° C. for one hour and then cooled to room temperature.

A mixture of 83.5 grams of the resulting hydrolyzed phosphite and 30.5 grams of pentaerythritol was heated to 120° C. While the mixture was agitated and maintained at 120°–130° C., 83.5 grams of diphenyl decyl phosphite was added. The mixture was heated at 120°–130° C. until it had become a substantially clear solution. An additional 502 grams of diphenyl decyl phosphite was added and the mixture was heated at 120°–130° C. until it became clear. Then 80.2 grams of a mixture containing equimolar amounts of zinc benzoate and zinc tert. butylbenzoate was added, and the mixture was again heated at 120°–130° C. until it became clear. While this solution was maintained at 120°–130° C. first 28.3 grams of 2,2-bis(4-hydroxyphenyl) propane and then 125.4 grams of barium myristate were added to it. When these components had dissolved, 66.6 grams of cadmium benzoate was added. The reaction mixture was then heated at 130°–140° C. for 2.5 hours, filtered, and cooled to yield 1000 grams of a product that was a clear liquid at room temperature (Stabilizer 1A).

Stabilizers 1B to 1L were prepared by the same procedure. In the preparation of these stabilizers, however, the proportions of the components were varied or other metal salts were substituted for those used in the preparation of Stabilizer 1A. Like Stabilizer 1A, these stabilizers were all clear, solvent-free liquids at room temperature.

Stabilizers 1M, 1N, and 1O were prepared by mixing at room temperature organic phosphites and hydrocarbon solutions containing metal salts, pentaerythritol, and 2,2-(4-hydroxyphenyl) propane in the amounts required to provide the relative amounts of the components indicated in Table I.

The relative amounts of the components used in the preparation of Stabilizers 1A–1O are set forth in Table I. It should be noted that Stabilizers 1A–1L do not have the composition indicated since the pentaerythritol, hydrolyzed diphenyl decyl phosphite, and diphenyl decyl phosphite were reacted to form a mixture of tertiary organic phosphites in which the other components were dissolved.

Table I

| Stabilizer | Components Used in Preparation of the Stabilizers (Percent by Weight based on Weight of Stabilizer) | | | | | | | | | | | | | | |
|---|---|---|---|---|---|---|---|---|---|---|---|---|---|---|---|
| | 1A | 1B | 1C | 1D | 1E | 1F | 1G | 1H | 1I | 1J | 1K | 1L | 1M | 1N | 1O |
| Hydrolyzed diphenyl decyl phosphite | 8.4 | 8.4 | 8.4 | 8.4 | 8.4 | 8.4 | 8.4 | 8.4 | 8.4 | 8.4 | 8.4 | 8.4 | ----- | 18.7 | 10.0 |
| Diphenyl decyl phosphite | 58.6 | 53.7 | 55.9 | 60.7 | 58.6 | 60.4 | 62.2 | 58.6 | 55.3 | 58.6 | 58.6 | 58.6 | 66.6 | 45.6 | 57.0 |
| Pentaerythritol | 3.0 | 3.0 | 3.0 | 3.0 | 3.0 | 3.0 | 3.0 | 3.0 | 3.0 | 3.0 | 3.0 | 3.0 | 4.9 | 6.9 | 4.7 |
| 2,2-(4-Hydroxyphenyl) propane | 2.8 | 2.8 | 2.8 | 2.8 | 2.8 | 2.8 | 2.8 | 2.8 | 2.8 | 2.8 | 2.8 | 2.8 | 4.9 | 4.9 | 4.7 |
| Zinc benzoate-zinc tert. butylbenzoate | 8.0 | 8.0 | 8.0 | 8.0 | 8.0 | ----- | ----- | 8.0 | 8.0 | 8.0 | 8.0 | 8.0 | ----- | ----- | ----- |
| Barium myristate | 12.5 | 17.4 | 12.5 | ----- | ----- | 12.5 | 12.5 | ----- | ----- | 12.5 | ----- | 12.5 | 12.5 | 12.7 | 12.5 |
| Cadmium benzoate | 6.7 | 6.7 | 10.4 | 6.7 | 6.7 | 6.7 | 6.7 | 6.7 | ----- | ----- | 6.7 | 6.7 | 6.7 | 6.8 | 6.7 |
| Barium tert. butylbenzoate | ----- | ----- | ----- | 10.4 | ----- | ----- | ----- | ----- | 10.4 | ----- | ----- | ----- | ----- | ----- | ----- |
| Calcium benzoate | ----- | ----- | ----- | ----- | 12.5 | ----- | ----- | ----- | ----- | ----- | ----- | ----- | ----- | ----- | ----- |
| Zinc tert. butylbenzoate | ----- | ----- | ----- | ----- | ----- | 6.2 | ----- | ----- | ----- | ----- | ----- | ----- | ----- | ----- | ----- |
| Zinc 2-ethylhexoate | ----- | ----- | ----- | ----- | ----- | ----- | 4.4 | ----- | ----- | ----- | ----- | ----- | ----- | ----- | ----- |
| Lead stearate | ----- | ----- | ----- | ----- | ----- | ----- | ----- | 12.5 | ----- | ----- | ----- | ----- | ----- | ----- | ----- |
| Cadmium stearate | ----- | ----- | ----- | ----- | ----- | ----- | ----- | ----- | 12.1 | ----- | ----- | ----- | ----- | ----- | ----- |
| Tin octoate | ----- | ----- | ----- | ----- | ----- | ----- | ----- | ----- | ----- | 6.7 | ----- | ----- | ----- | ----- | ----- |
| Strontium stearate | ----- | ----- | ----- | ----- | ----- | ----- | ----- | ----- | ----- | ----- | 12.5 | ----- | ----- | ----- | ----- |
| Zinc benzoate | ----- | ----- | ----- | ----- | ----- | ----- | ----- | ----- | ----- | ----- | ----- | ----- | 4.5 | 4.4 | 4.4 |

EXAMPLE 2

To 100 parts by weight of a vinyl chloride homopolymer (VC 100) were added 34 parts by weight of di-2-ethylhexyl phthalate, 8 parts by weight of isooctyl epoxystearate, 0.2 part by weight of stearic acid, and 1.5 parts by weight of one of the stabilizers of the present invention. The resulting mixture was blended at room temperature and then charged to a two-roll, steam-heated, differential speed mill whose surface temperature was maintained at 330° F. The mixture was milled for 5 minutes and then removed from the rolls as a sheet 0.045 inch in thickness.

The heat stability ratings of the compositions were determined by placing 1 x 1 inch specimens which had been cut from the milled sheets in a forced-circulation air oven at 375° F. and removing specimens periodically until degradation was complete as indicated by color change. The stabilizers used and the heat-stability ratings of the compositions are given in Table II. A numerical scale is used to indicate the color of the samples, with a rating of 1 denoting absence of color, 2 denoting a trace of color, 3 denoting light yellow, 4 denoting yellow, 5 denoting dark yellow, 6 denoting black edges, and 7 denoting black.

The milled sheets were pressed at 350° F. for 5 minutes. The clarity of the resulting films is indicated in Table II.

The tendency of the stabilizers to plate-out was measured by preparing by the hereinbefore described milling procedure a composition which contained in addition to the vinyl halide resin, plasticizer, epoxystearate, and stabilizer 0.67 part of Permanent Red 2B, a red pigment that is known to plate-out. After milling for 5 minutes at 330° F., the composition was removed from the mill. Then without an intervening cleaning of the mill rolls a white "clean-up" composition was run on the mill. This composition was prepared from 100 parts of polyvinyl chloride, 30 parts of dioctyl phthalate, 10 parts of calcium carbonate, 1 part of titanium dioxide (rutile), and 0.5 part of calcium stearate. The tendency of the composition to plate-out was determined by the degree of coloration of the "clean-up" composition. A numerical scale was used to indicate the plate-out ratings of the compositions. On this scale a rating of 1 denotes no plate-out, 2 denotes slight plate-out, 3 denotes moderate plate-out, and 4 denotes heavy plate-out. The plate-out ratings of the compositions are given in Table II.

Table II

| Stabilizer | Color After Indicated Number of Minutes at 375° F. | | | | | | | | Plate-out Rating | Clarity |
|---|---|---|---|---|---|---|---|---|---|---|
| | 10 | 20 | 30 | 40 | 50 | 60 | 70 | 80 | | |
| 1A | 1 | 1 | 3 | 4 | 5 | 6 | 6 | 7 | 1 | Very good. |
| 1B | 1 | 1 | 1 | 3 | 3 | 5 | 6 | 7 | 1 | Good. |
| 1C | 1 | 1 | 1 | 3 | 4 | 6 | 6 | 7 | 2 | Very good. |
| 1D | 1 | 1 | 3 | 4 | 5 | 6 | 6 | 7 | 2 | Excellent. |
| 1E | 1 | 2 | 4 | 4 | 5 | 6 | 6 | 7 | 4 | Cloudy. |
| 1F | 1 | 1 | 3 | 4 | 5 | 6 | 6 | 7 | 1 | Excellent. |
| 1G | 1 | 1 | 2 | 3 | 4 | 6 | 6 | 7 | 1 | Good. |
| 1H | 1 | 1 | 2 | 3 | 4 | 6 | 7 | ----- | 2 | Excellent. |
| 1I | 1 | 2 | 3 | 4 | 5 | 5 | 6 | 7 | 1 | Good. |
| 1J | 2 | 2 | 3 | 4 | 5 | 5 | 5 | 6 | 2 | Very good. |
| 1K | 1 | 1 | 3 | 4 | 6 | 6 | 7 | ----- | 4 | Cloudy. |
| 1L | 1 | 2 | 3 | 4 | 5 | 6 | 6 | 7 | 2 | Good. |
| 1M | 1 | 1 | 3 | 6 | 7 | ----- | ----- | ----- | 4 | Cloudy. |
| 1N | 1 | 1 | 3 | 3 | 5 | 6 | 7 | ----- | 3 | Good. |
| 1O | 1 | 2 | 3 | 5 | 6 | 6 | 7 | ----- | 3 | Do. |

From the data in Table II it will be seen that the compositions that contained the stabilizers of the present invention (Stabilizers 1A, 1B, 1C, 1D, 1F, 1G, 1H, 1I, 1J, and 1L) had excellent thermal stability, clarity, and resistance to plate-out. The compositions that contained the comparative Stabilizers 1E, 1K, 1M, 1N, or 1O, on the other hand, did not have the required clarity and resistance to plate-out.

EXAMPLE 3

A series of stabilizers was prepared by the procedure described in Example 1 that contained in place of the pentaerythritol an equivalent amount of another polyhydric alcohol or that contained another phenolic compound in place of the 2,2-(4-hydroxyphenyl) propane. These stabilizers were incorporated into vinyl halide resin compositions by the procedure described in Example 2. The relative amounts of the components that were used in the preparation of these stabilizers and the properties of the stabilized compositions are set forth in Table III.

Table III

| Stabilizer | Components Used in the Preparation of the Stabilizers (Percent by Weight) | | | | | |
|---|---|---|---|---|---|---|
| | 3A | 3B | 3C | 3D | 3E | 3F |
| Hydrolyzed diphenyl decyl phosphite | 8.4 | 8.4 | 8.4 | 8.4 | 8.4 | 8.4 |
| Diphenyl decyl phosphite | 58.6 | 58.6 | 58.6 | 58.6 | 58.6 | 58.6 |
| Pentaerythritol | 3.0 | | | | | 3.0 |
| Sorbitol | | 3.0 | | | | |
| Dipentaerythritol | | | 3.0 | | | |
| Trimethylolpropane | | | | 3.0 | | |
| Sucrose | | | | | 3.0 | |
| 2,2-(4-hydroxyphenyl) propane | 2.8 | 2.8 | 2.8 | 2.8 | 2.8 | |
| 2,6-di-tert. butyl-4-methyl-phenol | | | | | | 2.8 |
| Zinc benzoate-zinc tert. butylbenzoate | 8.0 | 8.0 | 8.0 | 8.0 | 8.0 | 8.0 |
| Barium myristate | 12.5 | 12.5 | 12.5 | 12.5 | 12.5 | 12.5 |
| Cadmium benzoate | 6.7 | 6.7 | 6.7 | 6.7 | 6.7 | 6.7 |
| Color After Indicated Number of Minutes at 375° C.: | | | | | | |
| 10 | 1 | 1 | 1 | 1 | 1 | 1 |
| 20 | 1 | 1 | 1 | 1 | 1 | 1 |
| 30 | 3 | 2 | 2 | 2 | 2 | 2 |
| 40 | 4 | 3 | 3 | 3 | 3 | 3 |
| 50 | 5 | 4 | 4 | 6 | 4 | 6 |
| 60 | 6 | 6 | 4 | 6 | 6 | 6 |
| 70 | 6 | 6 | 6 | 7 | 6 | 7 |
| 80 | 7 | 7 | 7 | | 7 | |
| Plate-out Rating | 1 | 1 | 4 | 1 | 4 | 2 |
| Clarity | (1) | (2) | (1) | (1) | (1) | (1) |

[1] Very good.
[2] Excellent.

From the data in Table III, it will be seen that the use of the stabilizers in which pentaerythritol, sorbitol, or trimethylolpropane served as the polyhydric alcohol component resulted in compositions that were clear and did not plate-out. The compositions that contained stabilizers derived from dipentaerythritol or sucrose showed heavy plate-out.

EXAMPLE 4

A series of stabilizers, prepared by the procedure described in Example 1, were incorporated into vinyl halide resin compositions by the procedure described in Example 2. The components used in the preparation of these stabilizers and the properties of the stabilized compositions are set forth in Table IV.

Table IV

| Stabilizer | Components Used in the Preparation of the Stabilizers (percent by weight) | | |
|---|---|---|---|
| | 4A | 4B | 4C |
| Hydrolyzed diphenyl decyl phosphite | 8.4 | | 8.4 |
| Hydrolyzed triphenyl phosphite | | 8.4 | |
| Diphenyl decyl phosphite | 58.6 | | |
| Triphenyl phosphite | | 58.6 | |
| Tridecyl phosphite | | | 58.6 |
| Pentaerythritol | 3.0 | 3.0 | 3.0 |
| 2,2-(4-hydroxyphenyl) propane | 2.8 | 2.8 | 2.8 |
| Zinc benzoate-zinc tert. butyl benzoate | 8.0 | 8.0 | 8.0 |
| Barium myristate | 12.5 | 12.5 | 12.5 |
| Cadmium benzoate | 6.7 | 6.7 | 6.7 |
| Color After Indicated Number of Minutes at 375° F.: | | | |
| 10 | 1 | 1 | 1 |
| 20 | 1 | 3 | 1 |
| 30 | 3 | 4 | 2 |
| 40 | 4 | 4 | 3 |
| 50 | 4 | 5 | 5 |
| 60 | 5 | 6 | 6 |
| 70 | 6 | 6 | 6 |
| 80 | 7 | 7 | 7 |
| Plate-out rating | 1 | 1 | 1 |
| Clarity | (1) | (1) | (2) |

[1] Very good.
[2] Good.

What is claimed is:

1. A liquid, solvent-free stabilizer for vinyl halide resin compositions which comprises (a) a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof, (ii) a secondary organic phosphite, and (iii) a tertiary organic phosphite in the amounts of approximately 0.5 mole to 5 moles of said secondary organic phosphite and 2 moles to 15 moles of said tertiary organic phosphite per mole of said polyhydric alcohol at a temperature between approximately 100° C. and 180° C. until a substantially clear solution is obtained; (b) monocarboxylic acid salts of at least two metals selected from the group consisting of barium, cadmium, zinc, lead, and tin; and (c) a phenolic compound in the amounts of approximately 2 parts to 10 parts by weight of said phenolic compound and approximately 35 parts to 60 parts by weight of said monocarboxylic acid salts per 100 parts by weight of said mixture of tertiary organic phosphites.

2. A liquid, solvent-free stabilizer for vinyl halide resin compositions which comprises (a) a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof, (ii) a secondary organic phosphite, and (iii) a tertiary organic phosphite in the amounts of 1 mole to 3 moles of said secondary organic phosphite and 5 moles to 10 moles of said tertiary organic phosphite per mole of said polyhydric alcohol at a temperature between approximately 100° C. and 180° C. until a substantially clear solution is obtained; (b) a mixture of barium, cadmium, and zinc salts of monocarboxylic acids that contains at least one salt of an aromatic acid; and (c) a phenolic compound in the amounts of approximately 2 parts to 10 parts by weight of said phenolic compound, 10 parts to 35 parts by weight of said barium salt, 5 parts to 25 parts by weight of said cadmium salt, and 5 parts to 25 parts by weight of said zinc salt per 100 parts by weight of said mixture of tertiary organic phosphites.

3. A liquid, solvent-free stabilizer for vinyl halide resin compositions that comprises (a) a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof; (ii) a secondary organic phosphite; and (iii) a tertiary organic phosphite in the amounts of 1 mole to 3 moles of said secondary organic phosphite and 5 moles to 10 moles of said tertiary organic phosphite per mole of said polyhydric alcohol at a temperature between 120° C. and 130° C. until a substantially clear solution was obtained; (b) a mixture of barium, cadmium, and zinc salts of monocarboxylic acids that contains at least one salt of an aromatic acid and at least one salt of an aliphatic acid; and (c) a phenolic compound in the amounts of approximately 10 parts to 35 parts by weight of said barium salt, 5 parts to 25 parts by weight of said cadmium salt, 5 parts to 25 parts by weight of said zinc salt, and 2 parts to 10 parts by weight of said phenolic compound per 100 parts by weight of said mixture of tertiary organic phosphites.

4. A liquid, solvent-free stabilizer for vinyl halide resin compositions that consists essentially of (a) 100 parts by weight of a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof; (ii) a secondary organic phosphite; and (iii) a tertiary organic phosphite in the amounts of 1 mole to 3 moles of said secondary organic phosphite and 5 moles to 10 moles of said tertiary organic phosphite per mole of said polyhydric alcohol at a temperature between 120° C. and 130° C. until a substantially clear solution is obtained; (b) 15 parts to 25 parts by weight of a barium salt of fatty acids having from 6 to 18 carbon atoms; (c) 7 parts to 15 parts by weight of cadmium benzoate; (d) 10 parts to 15 parts by weight of a zinc salt component selected from the group consisting of zinc salts of benzoic acid, alkylbenzoic acids, halobenzoic acids, fatty acids having from 6 to 18 carbon atoms, and mixtures thereof; and (e) 3 parts to 5 parts by weight of a phenolic compound.

5. A liquid, solvent-free stabilizer for vinyl halide resin compositions in accordance with claim 4 wherein the zinc salt component is a mixture of zinc benzoate and tert. butylbenzoate.

6. A liquid, solvent-free stabilizer for vinyl halide resin compositions in accordance with claim 4 wherein the phenolic compound is 2,2-bis(4-hydroxyphenyl) propane.

7. A liquid, solvent-free stabilizer for vinyl halide resin compositions in accordance with claim 4 wherein the polyhydric alcohol is pentaerythritol.

8. A liquid, solvent-free stabilizer for vinyl halide resin compositions in accordance with claim 4 wherein the polyhydric alcohol is sorbitol.

9. A liquid, solvent-free stabilizer for vinyl halide resin compositions in accordance with claim 4 wherein the secondary organic phosphite is the product obtained by heating a tertiary organic phosphite with 0.8 mole to 1.5 moles of water per mole of said tertiary phosphite at a temperature in the range of 50° C.–120° C. until substantially all of the tertiary organic phosphite has been hydrolyzed to form a mixture comprising a secondary organic phosphite and at least one by-product hydroxyl-containing compound.

10. A liquid, solvent-free stabilizer for vinyl halide resin compositions in accordance with claim 4 wherein the tertiary organic phosphite is diphenyl decyl phosphite and the secondary organic phosphite is the product obtained by heating diphenyl decyl phosphite with approximately 1 mole of water per mole of said phosphite at a temperature in the range of 65° C.–110° C. until substantially all of the diphenyl decyl phosphite has been hydrolyzed to form a mixture comprising a secondary organic phosphite, phenol, and decanol.

11. The process for the production of liquid, solvent-free stabilizers for vinyl halide resin compositions which comprises the steps of (a) heating a polyhydric alcohol selected from the group consisting of pentaerythritol, sorbitol, mannitol, trimethylolethane, trimethylolpropane, and mixtures thereof with a secondary organic phosphite and a tertiary organic phosphite in the amounts of approximately 0.5 mole to 5 moles of said secondary organic phosphite 2 moles to 15 moles of said tertiary organic phosphite per mole of said polyhydric alcohol at a temperature between approximately 100° C. and 180° C. until a substantially clear solution is formed; (b) adding to said phosphite solution approximately 2 parts to 10 parts by weight of a phenolic compound and 35 parts to 60 parts by weight of a mixture of monocarboxylic acid salts of at least two metals selected from the group consisting of barium, cadmium, zinc, lead, and tin per 100 parts by weight of said phosphite solution; and (c) heating the resulting mixture at a temperature between approximately 100° C. and 180° C. until a substantially clear solution is obtained.

12. The process for the production of liquid, solvent-free stabilizers for vinyl halide resin compositions which comprises the steps of (a) heating a polyhydric alcohol selected from the group consisting of pentaerythritol, sorbitol, mannitol, trimethylolethane, trimethylolpropane, and mixtures thereof with a secondary organic phosphite and a tertiary organic phosphite in the amounts of 1 mole to 3 moles of said secondary organic phosphite and 5 moles to 10 moles of said tertiary organic phosphite per mole of said polyhydric alcohol at a temperature between 120° C. and 130° C. until a substantially clear solution is formed; (b) adding to said phosphite solution approximately 3 parts to 5 parts by weight of 2,2-bis(4-hydroxyphenyl) propane and 35 parts to 60 parts by weight of a mixture of barium, cadmium, and zinc salts of monocarboxylic acids that contains at least one salt of an aromatic acid per 100 parts by weight of said phosphite solution; and (c) heating the resulting mixture at a temperature between 120° C. and 140° C. until a clear solution is obtained that remains substantially clear when it is cooled to room temperature.

13. The process for the production of liquid, solvent-free stabilizers for vinyl halide resin compositions which comprises the steps of (a) heating a polyhydric alcohol selected from the group consisting of pentaerythritol, sorbitol, mannitol, trimethylolethane, trimethylolpropane, and mixtures thereof with a secondary organic phosphite and a tertiary organic phosphite in the amounts of 1 mole to 3 moles of said secondary organic phosphite and 0.5 mole to 2 moles of said tertiary organic phosphite per mole of said polyhydric alcohol at a temperature between 120° C. and 130° C. until a substantially clear solution is obtained; (b) adding to said solution 4.5 moles to 8 moles of said tertiary organic phosphite per mole of polyhydric alcohol originally charged and heating the resulting mixture at a temperature between 120° C. and 130° C. until a substantially clear phosphite solution (I) is obtained; (c) adding to said phosphite solution 10 parts to 15 parts by weight of a zinc salt component selected from the group consisting of zinc salts of benzoic acid, alkylbenzoic acids, halobenzoic acids, fatty acids having from 6 to 18 carbon atoms, and mixtures thereof per 100 parts by weight of said phosphite solution (I) and heating the resulting mixture at a temperature between 120° C. and 130° C. until a substantially clear solution is obtained; and (d) adding seriatim to said solution 3 parts to 5 parts by weight of 2,2-(4-hydroxyphenyl) propane, 15 parts to 25 parts by weight of a barium salt of fatty acids having from 6 to 18 carbon atoms, and 7 parts to 15 parts by weight of cadmium benzoate per 100 parts by weight of said phosphite solution (I) and heating the resulting mixture at a temperature between 120° C. and 140° C. until a substantially clear solution is obtained.

14. The process in accordance with claim 13 wherein the polyhydric alcohol is pentaerythritol.

15. The process in accordance with claim 13 wherein the polyhydric alcohol is sorbitol.

16. The process in accordance with claim 13 wherein the tertiary organic phosphite is diphenyl decyl phosphite and the secondary organic phosphite is the product obtained by heating diphenyl decyl phosphite with 0.8 mole to 1.5 moles of water per mole of said phosphite at a temperature in the range of 50° C. to 120° C. until substantially all of the diphenyl decyl phosphite has been hydrolyzed to form a mixture comprising a secondary organic phosphite, phenol, and decanol.

17. The process in accordance with claim 13 wherein the zinc salt component is a mixture of zinc benzoate and zinc tert. butylbenzoate.

18. A mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof; (ii) a secondary organic phosphite; and (iii) a tertiary organic phosphite in the amounts of approximately 0.5 mole to 5 moles of said secondary organic phosphite and 2 moles to 15 moles of said tertiary organic phosphite per mole of said polyhydric alcohol at a temperature between approximately 100° C. and 180° C. until a substantially clear solution is obtained.

19. A mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof; (ii) a secondary organic phosphite; and (iii) a tertiary organic phosphite in the amounts of 1 mole to 3 moles of said secondary organic phosphite and 5 moles to 10 moles of said tertiary organic phosphite per mole of said polyhydric alcohol at a temperature between 120° C. and 130° C. until a substantially clear solution is obtained.

20. A heat and light stable resinous composition comprising a vinyl halide resin and a heat stabilizing amount of a liquid, solvent-free stabilizer which comprises (a) a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof, (ii) a secondary organic phosphite, and (iii) a tertiary organic phosphite in the amounts of approximately 0.5 mole to 5 moles of said secondary organic phosphite and 2 moles to 15 moles of said tertiary organic phosphite per mole of said polyhydric alcohol at a temperature between approximately 100° C. and 180° C. until a substantially clear solution is obtained; (b) monocarboxylic acid salts of at least two metals selected from the group consisting of barium, cadmium, zinc, lead, and tin; and (c) a phenolic compound in the amounts of approximately 2 parts to 10 parts by weight of said phenolic compound and approximately 35 parts to 60 parts by weight of said monocarboxylic acid salts per 100 parts by weight of said mixture of tertiary organic phosphites.

21. A heat and light stable resinous composition comprising polyvinyl chloride and approximately 0.1 part to 10 parts by weight per 100 parts by weight of said polyvinyl chloride of a liquid, solvent-free stabilizer comprising (a) a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof; (ii) a secondary organic phosphite; and (iii) a tertiary organic phosphite in the amounts of approximately 0.5 mole to 5 moles of said secondary organic phosphite and 2 moles to 15 moles of said tertiary organic phosphite per mole of said polyhydric alcohol at a temperature between approximately 100° C. and 180° C. until a substantially clear solution is obtained; (b) a mixture of barium, cadmium, and zinc salts of monocarboxylic acids that contains at least one salt of an aromatic acid and at least one salt of an aliphatic acid; and (c) a phenolic compound in the amounts of approximately 10 parts to 35 parts by weight of said barium salt, 5 parts to 25 parts by weight of said cadmium salt, 5 parts to 25 parts by weight of said zinc salt, and 2 parts to 10 parts by weight of said phenolic compound per 100 parts by weight of said mixture of tertiary organic phosphites.

22. A heat and light stable resinous composition comprising polyvinyl chloride and 0.5 part to 5 parts by weight per 100 parts by weight of said polyvinyl chloride of a liquid, solvent-free stabilizer comprising (a) 100 parts by weight of a mixture of tertiary organic phosphites that is the product obtained by heating (i) a polyhydric alcohol selected from the group consisting of pentaerythritol, sorbitol, mannitol, trimethylolethane, trimethylolpropane, and mixtures thereof; (ii) a secondary organic phosphite; and (iii) a tertiary organic phosphite in the amounts of 1 mole to 3 moles of said secondary organic phosphite and 5 moles to 10 moles of said tertiary organic phosphite per mole of said polyhydric alcohol at a temperature between 120° C and 130° C. until a substantially clear solution is obtained; (b) 15 parts to 25 parts by weight of a barium salt of fatty acids having from 6 to 18 carbon atoms; (c) 7 parts to 15 parts by weight of cadmium benzoate; (d) 10 parts to 15 parts by weight of a zinc salt component selected from the group consisting of zinc salts of benzoic acid, alkylbenzoic acids, halobenzoic acids, fatty acids having from 6 to 18 carbon atoms, and mixtures thereof; and (e) 3 parts to 5 parts by weight of 2,2-bis(4-hydroxyphenyl) propane.

23. A heat and light stable resinous composition in accordance with claim 22 wherein the zinc salt component is a mixture of zinc benzoate and zinc tert. butylbenzoate.

24. A heat and light stable resinous composition in accordance with claim 22 wherein the polyhydric alcohol is pentaerythritol.

25. A heat and light stable resinous composition in accordance with claim 22 wherein the polyhydric alcohol is sorbitol.

26. A heat and light stable resinous composition in accordance with claim 22 wherein the tertiary organic phosphite is diphenyl decyl phosphite and the secondary organic phosphite is the product obtained by heating diphenyl decyl phosphite with water in the amount of approximately 1 mole of water per mole of said phosphite at a temperature in the range of 65° C. to 110° C. until substantially all of the diphenyl decyl phosphite has been hydrolized to form a mixture comprising a secondary organic phosphite, phenol, and decanol.

27. A heat and light stable resinous composition in accordance with claim 22 wherein the barium salt is barium myristate.

References Cited by the Examiner

UNITED STATES PATENTS

| | | | |
|---|---|---|---|
| 2,625,521 | 1/1953 | Fischer et al. | 260—23 |
| 2,997,454 | 8/1961 | Leistner et al. | 260—45.7 |
| 3,050,499 | 8/1962 | Gordon et al. | 260—45.7 |
| 3,133,043 | 5/1964 | Rosenfelder et al. | 260—45.7 |
| 3,139,450 | 6/1964 | Friedman | 260—982 |
| 3,152,164 | 10/1964 | Oswald | 260—982 |
| 3,202,622 | 8/1965 | Scullin et al. | 260—23 |
| 3,245,926 | 4/1966 | Parker | 260—23 |

LEON J. BERCOVITZ, *Primary Examiner.*

R. A. WHITE, *Assistant Examiner.*